US008541077B2

(12) United States Patent
Patel et al.

(10) Patent No.: US 8,541,077 B2
(45) Date of Patent: Sep. 24, 2013

(54) ORIENTED MULTI-LAYER SHRINK LABELS (75) Inventors: Rajen M. Patel, Lake Jackson, TX (US); Debra H. Niemann, Lake Jackson, TX (US); Pak-Wing S. Chum, Lake Jackson, TX (US); Moris Amon, Beachwood, OH (US); Evgueni Rozenbaoum, Arcadia, CA (US); Chia-Hsi Chu, Arcadia, CA (US)

(73) Assignee: Dow Global Technologies LLC, Midland, MI (US)

( * ) Notice: Subject to any disclaimer, the term of this patent is extended or adjusted under 35 U.S.C. 154(b) by 723 days.

(21) Appl. No.: 12/093,891

(22) PCT Filed: Nov. 2, 2006

(86) PCT No.: PCT/US2006/042816
§ 371 (c)(1),
(2), (4) Date: Oct. 14, 2008

(87) PCT Pub. No.: WO2007/058783
PCT Pub. Date: May 24, 2007

(65) Prior Publication Data
US 2009/0220757 A1    Sep. 3, 2009

Related U.S. Application Data (60) Provisional application No. 60/736,685, filed on Nov. 15, 2005.

(51) Int. Cl.
B65B 53/00 (2006.01)
B32B 1/02 (2006.01)
B32B 1/08 (2006.01)
B32B 27/08 (2006.01)
B32B 27/30 (2006.01)
B32B 27/32 (2006.01)
B32B 27/36 (2006.01)

(52) U.S. Cl.
USPC ....... 428/34.9; 428/35.2; 428/35.4; 428/35.7; 428/36.8; 428/36.91; 428/480; 428/483; 428/500; 428/516; 428/518; 428/523

(58) Field of Classification Search
USPC .................... 428/34.1, 34.2, 34.9, 35.2, 35.4, 428/35.7, 36.6, 36.7, 36.8, 36.9, 36.91, 480–483, 428/500, 507–513, 515–523
See application file for complete search history.

(56) References Cited

U.S. PATENT DOCUMENTS

| 4,440,824 A | 4/1984 | Bonis |
| 4,469,752 A | 9/1984 | Yoshimura et al. |
| 4,501,634 A * | 2/1985 | Yoshimura et al. ...... 156/244.24 |
| 4,608,284 A | 8/1986 | Roales |
| 4,927,690 A | 5/1990 | Welsh |
| 4,963,419 A | 10/1990 | Lustig et al. |
| 4,976,898 A | 12/1990 | Lustig et al. |
| 5,015,521 A | 5/1991 | Fujii et al. |
| 5,023,143 A | 6/1991 | Nelson |
| RE33,832 E | 2/1992 | Yoshimura et al. |
| 5,158,836 A | 10/1992 | Schirmer et al. |
| 5,209,972 A | 5/1993 | Super et al. |
| 5,218,049 A | 6/1993 | Yamamoto et al. |
| 5,443,895 A | 8/1995 | Peiffer et al. |
| 5,494,717 A | 2/1996 | Peiffer et al. |
| 5,691,043 A | 11/1997 | Keller et al. |
| 5,846,620 A | 12/1998 | Compton |
| 5,859,116 A | 1/1999 | Shih |
| 5,958,581 A | 9/1999 | Khanarian et al. |
| 6,113,996 A | 9/2000 | Amon et al. |
| 6,808,822 B2 | 10/2004 | Rajan et al. |
| 6,897,260 B2 | 5/2005 | Vynckier et al. |
| 7,344,775 B2 | 3/2008 | Stevens et al. |
| 2003/0039775 A1 | 2/2003 | Kong |
| 2003/0068453 A1* | 4/2003 | Kong ........................ 428/35.2 |
| 2004/0126518 A1 | 7/2004 | Mendes et al. |

FOREIGN PATENT DOCUMENTS

| EP | 0226956 A1 | 7/1987 |
| EP | 0 667 234 | 8/1995 |
| EP | 1 013 415 | 6/2000 |
| EP | 1234854 A1 | 8/2002 |
| EP | 1270203 A1 | 1/2003 |
| EP | 1951524 A1 | 8/2008 |
| GB | 1113409 A | 11/1917 |
| JP | 2000202951 A | 5/1968 |
| JP | 2000211060 A | 8/2000 |
| JP | 2002215044 A | 7/2002 |
| WO | WO-98/22281 | 5/1998 |
| WO | WO-98/52749 | 11/1998 |
| WO | WO-02/066247 | 8/2002 |
| WO | WO-02066555 A2 | 8/2002 |
| WO | WO-2004/024433 | 3/2004 |
| WO | WO-2007015244 A1 | 2/2007 |
| WO | WO-2007050605 A2 | 5/2007 |

OTHER PUBLICATIONS

International Search Report PCT/US2006/042816.
PCT/US2006/042816, International Preliminary Report on Patentability, Mar. 18, 2008.
PCT/ US2006/042816,Written Opinion of the International Searching Authority.

* cited by examiner

Primary Examiner — Walter B Aughenbaugh (57) ABSTRACT

The present invention relates to a multi-layer oriented shrink film comprising at least one skin layer comprising a polystyrene material and at least one core layer comprising a polyolefin layer. The films are preferably primarily oriented in either the machine or the cross direction. These films are ideally suited for use as a shrink label which can be applied either as a CD shrink sleeve or applied using a continuous roll process. The films ideally have an overall density of less than 1.0 g/cm$^3$, to facilitate recycling efforts.

19 Claims, 4 Drawing Sheets

ORIENTED MULTI-LAYER SHRINK LABELS

CROSS-REFERENCE TO RELATED APPLICATION

This Application claims the benefit of U.S. Provisional Patent Application No. 60/736,685 filed Nov. 15, 2005.

FIELD OF THE INVENTION

The present invention relates to oriented shrink multi-layer film comprising at least one skin layer comprising an amorphous glassy polymer material such as polystyrene materials and at least one core layer comprising a polyolefin layer. The films are preferably primarily oriented in either the machine or the cross direction. These films are ideally suited for use as a shrink label which can be applied either as a CD shrink sleeve or applied using a continuous roll process. The films ideally have an overall density of less than 1.0 g/cm$^3$, to facilitate recycling efforts using aqueous floatation separation techniques.

BACKGROUND AND SUMMARY OF THE INVENTION

Shrink labels generally fall into two categories: roll-on shrink-on (ROSO) labels and sleeve-type labels (sleeve labels). ROSO labels are film sheets that wrap around a container. Sleeve labels are tubular in configuration and fit around a container by placement over the container. Application of heat to a shrink label that is around a container causes the label to shrink and conform to the container.

To conform to a container, each type of label must shrink preferentially (that is, to a greater extent in one direction than in another direction) in the direction extending circumferentially around the container. ROSO films reside on a container with the machine direction (MD) of the film extending circumferentially around the container. Hence, ROSO films primarily shrink in the film's machine direction (MD) due to preferential machine direction orientation (MDO). In contrast, sleeve labels typically reside on a container with the label's transverse direction (TD) (also known as the cross direction or "CD") extending circumferentially around the container. Hence, sleeve labels shrink primarily in the film's transverse direction (TD) due to preferential transverse direction orientation (TDO).

ROSO labels are particularly desirably over sleeve labels because they entail less processing and are less costly to produce. ROSO labels are typically in roll form resulting from printing onto an oriented film in a continuous web process. In contrast, sleeve labels, while also available in roll form, require printing, cutting and gluing into sleeves prior to rolling into roll form, complicating the manufacturing process and increasing manufacturing costs for sleeve labels relative to ROSO labels. Furthermore, orienting films in the TD for sleeve labels tends to be more expensive due to the relatively higher cost of the equipment than orienting films in the MD for ROSO labels. Additionally, ROSO application of ROSO labels to containers is typically a faster process than application of sleeve labels.

While ROSO labels offer advantages in production speed, sleeve labels historically have enjoyed an advantage in extent of shrinkage around a container. Sleeve labels typically shrink up to 70 percent (%) around the circumference of a container. In contrast, typical ROSO films historically demonstrate only up to about 20 percent shrinkage around the circumference of a container. For ROSO labels, it is desired that the shrink in the MD be greater than 25 percent, more preferably greater than about 50 percent. Lower shrinkage in the typical ROSO labels is mainly due to: (1) predominant use of oriented polypropylene (OPP), a crystalline polymer, for the film and (2) a limitation on the stress allowed on a glue seam holding the label in place (wrapped) around a container—too much stress on the glue seam can cause the label to shift on the container or, in an extreme case, cause the glue joint to fail and the label to unwrap from around the container. Hence the shrink tension observed for a film is an important factor for determining whether it is suitable for use as a ROSO label, with lower shrink tension being generally preferred. Sleeve labels, which either have no glue joint or have a glue joint that is extensively cured prior to application to a container, can tolerate a greater extent of stress during shrinkage.

Sleeve labels historically enjoy more extensive shrinkage and therefore have conformed better to contoured containers than ROSO labels. However, in view of the production advantages of ROSO labels, it is desirable to identify an oriented film suitable for preparing a ROSO label that can shrink circumferentially around a container to a greater extent than current ROSO labels (that is, more comparable to sleeve labels) but without the detriment of failure at the glue joint of the label.

Polystyrene (PS) is sometimes used to make films for use in shrink labels as PS retains a higher surface energy after corona treatment (necessary to render the surface of a polymer film suitable for printing) for extended periods of time relative to PP. Therefore, unlike PP films, corona treatment of PS films can occur during manufacture rather than just prior to printing into labels.

Polystyrene-based shrink label films often include a high impact polystyrene (HIPS) component in order to improve label toughness (for example, tear resistance). However, rubber particles in a typical HIPS range have an average particle size of greater than one micrometer (see, for example, U.S. Pat. No. 6,897,260, column 4, lines 26-27). Large rubber particles tend to decrease clarity of a label film, interfering with the use of the film for reverse side printing (printing on the side of a label film proximate to the container so that it is readable through the film) as well as with viewing of the container or product through the label. Typical HIPS also contains greater than 7 percent rubber based on total HIPS weight. High concentrations of rubber can hinder the printability of a film, decrease clarity of a film, reduce dimensional stability and undesirably increase gel amount in a final film.

In contrast to copolyester and polyvinyl chloride (PVC) films, use of PS films facilitate bottle and label recyclability, as the lower density allows the label to be more easily separated from the higher density (for example, polyester) bottles. It would be even more beneficial for recyclability if the density of the shrink film were less than 1.0 g/cc as this would allow flotation separation techniques.

Furthermore, lower density films advantageously provide a higher film yield, or more area/lb. of film. Higher density label stock, such as copolyester or PVC films, do not provide similar advantages.

It is desirable to have an oriented multi layer film that is suitable for ROSO or shrink sleeve label applications.

U.S. Provisional application 60/703,385 filed on Jul. 28, 2005, and hereby incorporated by reference in its entirety, teaches a biaxially oriented polystyrene-based film suitable for use as a ROSO label which contained HIPS with a rubber particle size and rubber concentration below that of typical HIPS. It would be desirable to provide a shrink film exhibiting even less shrink tension than the films taught in 60/703,385. It would also be desirable if the overall density of the shrink film was less than about 1 g/cm³ to facilitate separation of the label from the bottle using flotation techniques in the recycling process.

Accordingly, in a first aspect, the present invention is an oriented multi-layer shrink film comprising at least one skin layer comprising an amorphous glassy polymer such as a polystyrene material and at least one core layer comprising a polyolefin layer. The multilayer film can be preferentially oriented in the machine direction, for example using a set of MDO rolls, or in the cross direction, for example using the tenter frame process. The amorphous glassy polymer materials are preferably polystyrene materials which may be general purpose polystyrene (GPPS) or may include other styrenic materials to impart durability and toughness as is generally known in the art. These other materials include materials such as high impact polystyrene, styrenic block copolymers such as K-resin (from Chevron Phillips), SBS (styrene butadiene styrene triblock copolymer), SIS (styrene isoprene styrene), SEBS (styrene ethylene-butylene styrene triblock copolymers), and/or combinations thereof. When high impact polystyrene is desired, it is preferred for the film to contain a high impact polystyrene of a type that has smaller rubber particles and lower rubber concentrations than that of typical HIPS in order to achieve film toughening without hindering printability, clarity or contact clarity of the film. The polyolefin used in the at least one core layer preferably can be selected to control the shrink tension of the film and shrinkage of the film depending on the requirements of the intended application.

In another aspect, the multilayer films of the present invention also comprise one or more tie layers between the polyolefin layer and the polystyrene skin layer.

In another aspect, the present invention is a shrink label comprising a multi-layer film of the first or second aspects wherein the film has printing on one or both sides.

DETAILED DESCRIPTION OF THE INVENTION

Oriented multi-layer shrink films of the present invention comprise at least one skin layer comprising an amorphous glassy polymer and at least one other layer comprising a polyolefin layer. The preferred amorphous glassy polymer materials are polystyrene materials. The multi-layer films of the present invention preferably contain a second skin layer on the opposite side comprising an amorphous glassy polymer material with the polyolefin layer comprising a core layer. The preferred materials for the second skin layer are the same as for the first skin layer. Optionally, the multi-layer films may comprise one or more tie layers between the skin layer and the polyolefin layer.

A. Skin Layer

The skin layer comprises an amorphous glassy polymer. Amorphous glassy polymers are those which have a glass transition temperature (as determined from the appropriate peak in tan(delta) curve measured using dynamic mechanical thermal analysis) above room temperature and are substantially amorphous (that is a crystallinity less than about 10 weight percent, as determined by, for example, wide angle x-ray diffraction). Amorphous glassy polymers include polystyrene materials (for example GPPS, HIPS, K RESIN, SIS, SBS, SEBS) as well as PETG, amorphous PET, amorphous PLA or PVC. When GPPS is used as the amorphous glassy polymer material, the GPPS desirably has a Mw (weight average molecular weight) of more than 100,000 g/mol, preferably 150,000 g/mol or more, more preferably 200,000 g/mol or more. The GPPS also desirably has a Mw (weight average molecular weight) less than about 350,000 g/mol, preferably less than about 320,000 g/mol. Mw can be determined according to gel permeation chromatography as known in the art. The GPPS desirably has a melt flow rate (MFR) of one or more, preferably 1.2 grams per 10 minutes (g/10 min) or more and desirably 20 g/10 min or less, preferably 10 g/10 min or less. MFR for polystyrene materials is determined according to ASTM method D1238 (5 kg weight at 200° C.).

Examples of suitable GPPS include STYRON™ 663 general purpose polystyrene (STYRON is a trademark of The Dow Chemical Company), STYRON 668 and STYRON 685D.

If greater ductility and/or toughness are desired, then one or both skin layers may comprise other materials such as HIPS, SBS, K-resin, SIS, SEBS and the like. Preferably these additional materials are selected so as to maintain optical clarity. One particularly useful class of HIPS for use in one or more skin layers of the present invention are described in U.S. patent application Ser. No. 11/191,817 filed Jul. 28, 2005 entitled: IMPROVED RUBBER MODIFIED MONOVINYLIDENE AROMATIC POLYMERS AND THEMOFORMED ARTICLES, which is hereby incorporated by reference in its entirety.

The amorphous glassy polymer skin layer may contain other additives such as mineral oil or other plasticizers, as well as other additives as is generally known in the art. This includes materials such as inorganic fillers, conductive fillers, pigments, antioxidants, acid scavengers, flame retardants, ultraviolet absorbers, processing aids such as zinc stearate, extrusion aids, slip additives, permeability modifiers, antistatic agents, antiblock additives and other thermoplastic polymers.

It is also contemplated that the skin layers may comprise other amorphous glassy polymers such as PETG (polyethylene terephthalate, G), amorphous PET (polyethylene terephthalate), amorphous PLA (polylactic acid). Polyvinyl chloride (PVC) and/or combinations thereof. These materials tend to have higher densities which may result in the film's overall density being greater than 1 g/cm³, which may make the film less preferred due to recycling considerations.

It is also contemplated that combinations of two or more amorphous glass polymers may be used in one or both skin layers.

The skin layers will preferably comprise from 10 percent by weight to 80 percent, more preferably from 10 to 70 percent, more preferably from 20 to 50 by percent and most preferably from 30 to 50 percent by weight of the multilayer films of the present invention.

B) Polyolefin Layer

The multilayer films of the present invention also contain a second layer which comprises a polyolefin material. Preferred polyolefin materials include polyethylene homo- and co-polymers and polypropylene homo- and co-polymers. These include low density polyethylene, linear low density polyethylene, very low (or ultra low) density polyethylene, polyethylene plastomers and elastomers such as homogeneously branched linear ethylene polymer and substantially linear ethylene polymer, medium density polyethylene and high density polyethylene), homopolymer polypropylene ("hPP") random copolymer polypropylene ("RCP"), and propylene based plastomers and elastomers such as those disclosed in WO03/040442, which is hereby incorporated by reference in its entirety, and combinations thereof. Polyolefin plastomers and elastomers are most preferred, particularly polyethylene plastomers and elastomers and polypropylene plastomers and elastomers, including the propylene based plastomers and elastomers described in WO03/040442, and U.S. application 60/709,668 filed Aug. 19, 2005 (each of which is hereby incorporated by reference in its entirety)—some of these materials are commercially available from The Dow Chemical Company under the trade name Versify™, and the propylene based plastomers and elastomers sold by ExxonMobil Chemical company under the trade name of Vistamaxx™. The density of the polyolefin core layer is preferably less than 0.920 $g/cm^3$, more preferably less than 0.90 $g/cm^3$, more preferably less than about 0.89 $g/cm^3$ and most preferably less than about 0.88 $g/cm^3$.

The polyolefin component can be chosen to provide an appropriate melting point and crystallinity in order to control the shrink tension of the film. Preferably, the polyolefin resin (or blend) chosen will have a melting point below 150° C., more preferably less than 135° C. and even more preferably less than 120° C., and most preferably less than 100° C.

The polyolefin component may also advantageously contain various additives as is generally known in the art. This includes materials such as inorganic fillers, conductive fillers, pigments, antioxidants, acid scavengers, flame retardants, ultraviolet absorbers, processing aids, extrusion aids, slip additives, permeability modifiers, anti-static agents, anti-block additives and other thermoplastic polymers.

The polyolefin layers will preferably comprise from 20 percent by weight to 90 percent, more preferably from 30 to 90 percent, still more preferably from 50 to 80 percent, and even more preferably from 50 to 70 percent by weight of the multilayer films of the present invention.

C) Tie Layers

The multi-layer films of the present invention may optionally also comprise one or more tie layers. Tie layers can be beneficial in helping to ensure good adhesion between the glassy amorphous polymer layers and the interior or core polyolefin layers. Suitable polymer for use as a tie layer when using polystyrene materials in the skin layers include SEBS and SEPS block copolymer and their formulations, EVA, SBS, SIS, K-resin, and combinations thereof.

The tie layers may also advantageously contain various additives as is generally known in the art. This includes materials such as inorganic fillers, conductive fillers, pigments, antioxidants, acid scavengers, flame retardants, ultraviolet absorbers, processing aids, extrusion aids, slip additives, permeability modifiers, anti-static agents, antiblock additives and other thermoplastic polymers.

The tie layers, if present, will preferably comprise from 5 percent by weight to 15 percent by weight of the entire multi-layer film.

Overall Film

It is preferred that the resins for each of the layers present in the multi-layer film such that the overall density of the film is less than 1.0 $g/cm^3$, more preferably less than 0.98 $g/cm^3$, as determined by ASTM D-792.

Films of the present invention are oriented which means that they have monoaxial orientation or biaxial orientation with preferential orientation either in the machine direction (MD) or the cross direction (CD). Preferential orientation means that orientation is greater in the machine or cross direction than in the other direction. The degree of orientation is at least 2×, preferably at least 3× and most preferably at least 4× in either the MD or CD depending on the shrinkage direction desired. Oriented shrink films of the present invention will generally have a shrink tension greater than about 50 psi, preferably more than 100 psi at 135° C. There is no clear upper limit on for MDO ratio, although films typically have a MDO ratio of 20 or less. Films having an MDO ratio greater than 20 risk shrinking around a container in a ROSO label application with such a high force that a glue seem holding the label around the bottle can weaken or fail. This is also true for TDO ratio in shrink sleeve applications.

Measure MDO ratio for a MD oriented ROSO label by using a sample which is 10 cm long in MD and 2.5 cm in TD Place the sample in a hot oil bath (ASTM D2732) kept above the melting point of the highest melting resin and above the glass transition temperature of the skin layers for 30 seconds. Then measure MD dimension again. The ratio of pre- to -post-heated MD dimensions correspond to MDO ratio.

Measure TDO ratio for a TD oriented shrink sleeve label by using a sample which is 10 cm long in TD and 2.5 cm in MD Place the sample in a hot oil bath (ASTM D2732) kept above the melting point of the highest melting resin and above the glass transition temperature of the skin layers for 30 seconds. Then measure TD dimension again. The ratio of pre- to -post-heated TD dimensions correspond to TDO ratio.

The multi-layer films of the present invention can be conveniently made before the orientation step using the cast film process, the blown film process, the extrusion coating process or lamination process, with the cast film process being preferred.

The film temperature during drawing/orientation used in the film manufacturing process can be chosen to help control the shrink tension. Preferably the film draw temperature is between 100° C. and 150° C., more preferably between 120° C. and 135° C.

When MD orientation is desired it may be conveniently achieved using a set of MDO rolls. When CD orientation is desired, it may conveniently be achieved using the tenter frame process. These procedures and others for achieving orientation are well-known in the art.

Particularly when the multi-layer films of the present invention are to be used in a ROSO label, the film should have a shrink tension less than about 500 psi, more preferably less than 400 psi, more preferably less than 300 psi and most preferably less than about 250 psi. Sleeve labels can tolerate higher shrink tension, for example greater than 1100 psi or even greater than 1400 psi. Shrink tension is determined according to ASTM D-2838.

Films of the present invention desirably demonstrate a shrinkage under normal shrink label application temperatures (for example from 110° C. to 140° C. for ROSO or from 110° C. to 130° C. for sleeve) in the preferred orientation direction (when oriented at a temperature from 120° C. to 130° C.) of 20 percent or more, preferably 30 percent or more, more preferably 40 percent or more, still more preferably 50 percent or more, yet more preferably 60 percent or more, even yet more preferably 70 percent or more in the oriented direction. Shrinkage below 20 percent tends to undesirably limit the extent to which a film can conform to a container contour. While an upper limit on the extent of shrink is unknown, it will be below 100 percent.

Desirably, the films demonstrate a shrinkage under normal shrink label application temperatures (for example from 110° C. to 140° C. for ROSO or from 110° C. to 130° C. for sleeve) in the direction opposite that of the preferential orientation (when oriented at a temperature from 120° C. to 130° C.) of 30 percent or less, preferably 20 percent or less, more preferably 10 percent or less, even more preferably 5 percent or less. It should be understood that "less than 5 percent" shrinkage also includes growth, although the growth should be minimized.

Clarity (especially contact clarity) and transparency are desirable in the label industry in some applications to provide a non-obscured view of a product around which the label resides. High clarity and transparency are also desirable for "reverse" printing of labels where printing resides between the label and the container and a consumer views the printing through the label. Typically, films of the present invention have clarity values at a film thickness of 2.0 mils (50 μm) of 10 or more, preferably 15 or more, more preferably 20 or more, still more preferably 25 or more, even more preferably 30 or more. Clarity is determined according to ASTM method D-1746.

Haze values also provide a measure of a film's clarity, with low haze corresponding to high clarity. Haze values for films of the present invention can range to any conceivable value. However, one advantage of the present invention is the ability to obtain oriented films with high clarity and low haze. Typical haze values for the present films at a film thickness of 2.0 mils (50 μm) are 20 or less, preferably less than 15, more preferably 10 or less, still more preferably 8 or less, even more preferably 6 or less, most preferably 4 or less. Haze is determined according to ASTM method D-1003.

The stiffness of the multi-layer films of the present invention is important among other reasons, for proper dispensing of ROSO labels at high line speeds. The stiffness of the oriented multi-layer films in the preferred orientation direction should be at least about 5 Gurley, and generally may be as high as 150 Gurley. More often, the stiffness of the oriented multi-layer films is in the range of 20 to 70 Gurley as measured in accordance with the TAPPI Gurley stiffness test T543pm.

Although the films may have any desired thickness, the films of the present invention will generally have an overall thickness of one mil (25 μm) or more, preferably 1.5 mils (38 μm) or more and generally 4 mils (100 μm) or less, preferably 3 mils (76 μm) or less. At a thickness of less than one mil (25 μm), films tend to be undesirably difficult to cut during processing and handling. Thicknesses greater than 4 mils (100 μm) are technically achievable, but generally economically undesirable. Films of the present invention desirably have a shrink tension or orientation release stress (ORS) of 500 psi (2758 kPa) or less more preferably less than 400 psi, more preferably less than 300 psi and most preferably less than about 250 psi. Shrink tension is determined according to ASTM D-2838. ORS is a measure of the stress the film experiences during shrinkage upon heating. Lowering ORS values in a ROSO film is desirable. ROSO films typically have at least one end glued to a container around which the film is applied. Labels with high ORS values can apply sufficient stress to a glue seam holding the label around a container during shrinkage so as to damage or break the seam. Lowering ORS values decreases the likelihood that the seam line (film on film) becomes damaged or broken during shrinkage.

Films of the present invention have utility in any application that benefits from heat triggered shrinkage in the MD or TD. The films have a particular utility as ROSO labels. To convert a film of the present invention into a ROSO label of the present invention cut the film to a desirably width and corona treat a side of the film (in any order) and then print on the corona treated side of the film. Printing can reside on the "reverse" side of the film to create a reverse printed label. The reverse side of the film resides against a container and printing on the reverse side is viewed through the film when the film is around a container in a ROSO label application. These steps are typically done on a continuous web process by any method useful in the art.

Films and labels of the present invention can also advantageously possess perforations through the film or label. Perforations are most desirably located in the portion of a film proximate to the narrowest portion or portions of a container around which the film is applied in a ROSO application. The perforations allow gas that would otherwise tend to become trapped between the label and container to escape, thereby allowing the label to more tightly conform to the container. Films, and labels, of the present invention can contain perforations uniformly distributed across a film surface or contain perforations specifically located proximate to the areas of the film (or label) that will coincide with the narrowest portions of a container around which the film (or label) will reside. Perforation of films and labels of the present invention can be perforated at any time; however, in order to facilitate printing of ROSO labels, desirably perforate films and labels after printing.

The following example serves as an illustration of the present invention and does not serve to establish the full scope of the present invention.

EXAMPLES

For examples 1 and 2, two multi-layer cast films are prepared using multi-layer cast film line. Each film has an A/B/C/B/A structure where the A layers are the skin layers comprising amorphous glassy polymer materials, the B layers are tie layers and the C layer is the polyolefin layer. The composition of the films are as follows:

Example 1

Skin layers, each at about 25 wt percent of overall film structure, are made from Styron™ 668 GPPS (density=1.05 g/cc, MFR=5.5 g/10 min (5 kg/200° C.)). Tie-layers, each at about 12 wt percent of the overall film structure, are made from KRATON G1730M (density=0.90 g/cc; MI=13 g/10 min(5 kg/230° C.)). The core layer is a developmental propylene plastomer of the type described in WO03/040442 having 5 wt percent ethylene and a melt flow rate of 8 g/10 min (ASTM D1238, 230° C., 2.16 kg) and a density of 0.888 g/cc. The core layer is about 26 percent of the total structure. The calculated density of the film is about 0.974 gm/cc. The average total film thickness before the orientation step is about 112 microns.

Example 2

Skin layers, each at about 21 wt percent of overall film structure, are made from Styron™ 668 GPPS. Tie-layers, each at about 12 wt percent of the overall film structure, are made from KRATON G1730M. The core layer is a developmental propylene plastomer of the type described in WO03/040442 having 5 wt percent ethylene and a melt flow rate of 8 g/10 min (ASTM D1238 230° C., 2.16 kg), and a density of 0.888 g/cc. The core layer is about 34 percent of the total structure. The calculated density of the film is about 0.961 gm/cc. The average total film thickness before the orientation step is about 124 microns.

The film extrusion conditions for each Example are shown in Table I:

TABLE I

|  | Example 1 Layer: | | | | Example 2 | | | |
| --- | --- | --- | --- | --- | --- | --- | --- | --- |
|  | Skin Layers | Core Layer | Core Layer | Tie Layers | Skin Layers | Core Layer | Core Layer | Tie Layers |
| Extruder no. | 1 | 2 | 3 | 4 | 1 | 2 | 3 | 4 |
| Screw RPM | 54 | 24 | 20 | 12 | 35 | 30 | 40 | 15 |
| Drive amps | 3 | 8 | 10.5 |  | 5 | 8 | 15 |  |
| Barrel Pressure (Psi) | 1950 | 1300 | 1730 | 3274 | 2070 | 1530 | 2290 | 3670 |
| Barrel Zone 1 (F.) | 350 | 380 | 380 | 350 | 350 | 380 | 380 | 350 |
| Barrel Zone 2 (F.) | 375 | 435 | 435 | 390 | 375 | 435 | 435 | 390 |
| Barrel Zone 3 (F.) | 400 | 410 | 410 | 399 | 400 | 410 | 410 | 400 |
| Barrel Zone 4 (F.) | 440 | 420 |  | 413 | 440 | 420 |  | 416 |
| Screen changer (F.) | 440 |  | 420 | 415 | 440 |  | 420 | 415 |
| Adapter (F.) | 440 | 420 | 420 | 415 | 440 | 420 | 420 | 415 |
| Transfer line (F) | 440 | 420 | 420 | 415 | 440 | 420 | 420 | 415 |
| Melt temperature | 431 | 426 | 417 | 422 | 427 | 427 | 426 | 425 |
| Chill roll temp. | 130 |  |  |  | 130 |  |  |  |

These cast films can be stretched using a Bruckner Karo IV unit under the conditions shown in Table II below. The films stretch without tearing or breaks under the indicated stretching conditions. The films appear very stiff (crinkly) under bending mode suggesting that they have excellent bending rigidity needed for label application. The stretching conditions and shrink properties of the shrink label films are described below. Shrinkage is measured using ASTM D2732 (hot-oil bath) using immersion time of about 20 sec. Shrink tension is measured using ASTM D2838.

TABLE II

| Example | Stretch Direction | Stretch Temp (° C.) | Stretch Ratio | Preheat time (sec) | Stretch Rate (%/min) | Final Thickness (mil) | Shrink tension (PSI) at 135° C. | Shrinkage at 135° C. |
| --- | --- | --- | --- | --- | --- | --- | --- | --- |
| 1 | MD | 130 | 4x | 40 | 1000 | 1.05 | 150 | 75 |
| 2 | MD | 130 | 4x | 40 | 1000 | 1.25 | 140 | 75 |
| 2 | CD | 130 | 4x | 40 | 1000 | 1.2 | 55 | 75 |
| 1 | CD | 130 | 4x | 40 | 200 | 1.0 | 70 | 75 |
| 1 | MD | 130 | 5x | 40 | 50 | 0.8 | 206 | 79 |
| 1 | CD | 130 | 5x | 40 | 50 | 0.8 | 95 | 78 |
| 2 | MD | 130 | 5x | 40 | 50 | 0.9 | 210 | 79 |
| 2 | CD | 130 | 5x | 40 | 50 | 0.9 | 79 | 74 |

The above data shows that shrink label film with excellent shrinkage in either MD or CD direction is achieved using the film composition of the current invention. The shrink tension of the inventive films are also low in all examples, less than 250 psi, as desired.

Example 3

Another five layer structure was prepared. The skin layers are provided by Extruder A and C in this extrusion system and are each 15 wt percent of the overall film structure. These layers are made from a dry blend of 70 percent STYRON 668 GPPS and 30 percent K-Resin styrene-butadiene copolymer DK11 (available from Chevron Phillips). The tie layers are each 10 wt percent of the total film structure and are provided by Extruder D. The tie layers are made from KRATON G1730M. The core layer is 50 wt percent of the total film structure and is provided by Extruder B in this system. The core layer is a developmental propylene plastomer of the type described in WO03/040442 having 5 wt percent ethylene and a melt flow rate of 8 g/10 min. (ASTM D1238, 230 C, 2.6 kg) and a density of 0.888 g/cc.

Orientation is done in the machine direction using variable speed rolls to impart various levels of orientation as set forth in Sample 3-1 and 3-2.

Process conditions are set forth in Table III:

TABLE III

|  | Units | Sample 3-1 | Sample 3-2 |
| --- | --- | --- | --- |
| Extruder A formulation (skin layer) | | | |
| Screw speed | rpm | 21.7 | 22.1 |
| Head pressure | psi | 2109 | 2093 |
| Melt temperature | F. | 449 | 447 |
| Motor torque | % | 60.7 | 54.3 |
| Extruder B formulation (core layer) | | | |
| Screw speed | rpm | 17 | 16.9 |
| Head pressure | psig | 1280 | 1203 |
| Melt temperature | F. | 431 | 439 |
| Motor torque | % | 30.5 | 28.1 |

TABLE III-continued

|  | Units | Sample 3-1 | Sample 3-2 |
|---|---|---|---|
| Extruder C formulation (skin layer) |  |  |  |
| Screw speed | rpm | 21.8 | 22.1 |
| Head pressure | psi | 1370 | 1343 |
| Melt temperature | F. | 434 | 435 |
| Motor torque | % | 60.2 | 57 |
| Extruder D formulation (tie layer) |  |  |  |
| Screw speed | rpm | 4.02 | 4.02 |
| Head pressure | psi | 1254 | 1273 |
| Melt temperature | F. | 2192 | 2192 |
| Motor torque | % | 24.1 | 23.1 |
| Cast Roll #1 | F. | 145 | 145 |
| Cast Roll #2 | F. | 129 | 130 |
| Cast line speed | fpm | 21 | 22.45 |
| MDO |  |  |  |
| Preheat #1 | F. | 170 | 170 |
| Preheat #2 | F. | 225 | 225 |
| Slow draw temp | F. | 266 | 265 |
| Fast draw temp | F. | 244 | 244 |
| Anneal | F. | 112 | 117 |
| Cooling | F. | 100 | 101 |
| Slow draw speed | fpm | 21.26 | 5.44 |
| Slow draw ratio | fpm | 1.08 | 1.08 |
| Fast draw speed |  | 106.3 | 5.437 |
| Fast draw ratio |  | 5 | 4.25 |

Figure 1:
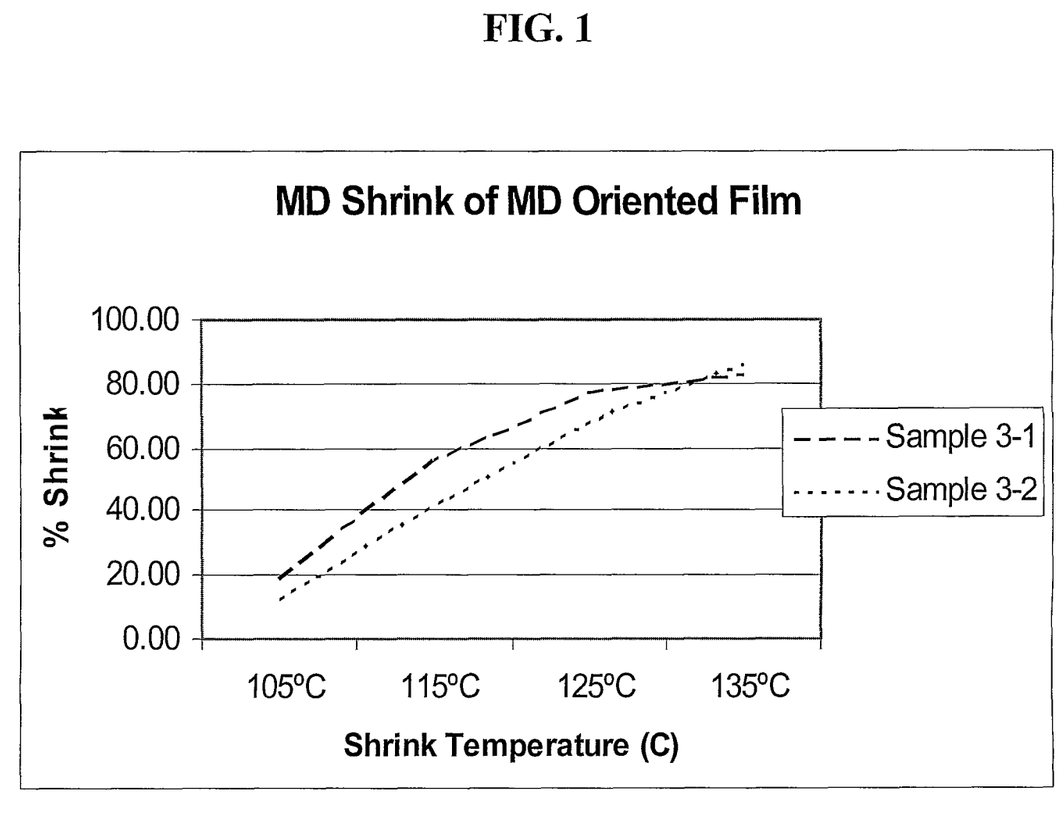
FIG. 1 is a graph showing the MD shrink data for the films of Samples 3-1 and 3-2.
Figure 2:
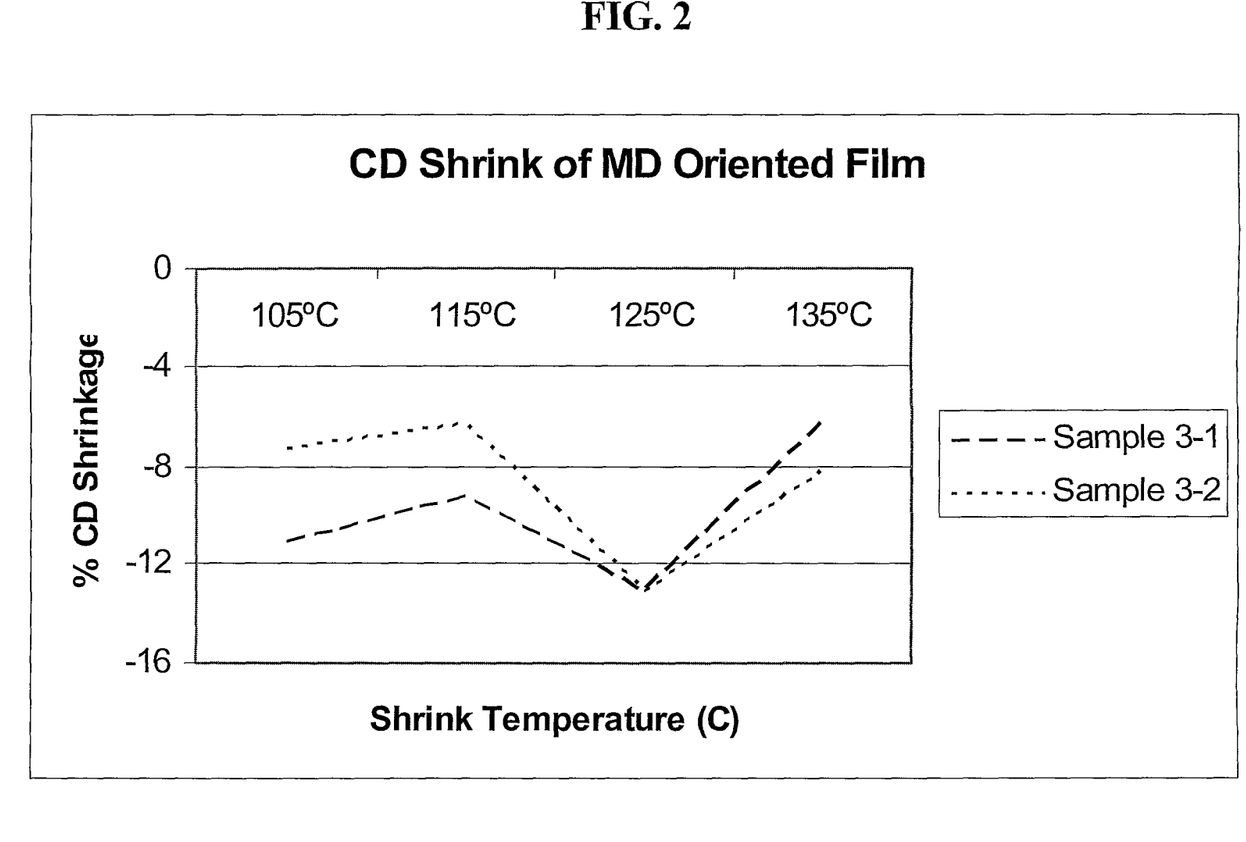
FIG. 2 is a graph showing the CD shrink data for the films of Samples 3-1 and 3-2.

The shrink data for the resulting films of Samples 3-1 and 3-2 are shown in FIGS. 1 and 2.

The film properties for these samples are presented in Table IV

TABLE IV

|  | ASTM test method | Sample 3-1 | Sample 3-2 |
|---|---|---|---|
| Average Clarity | D1746 | 94.7 | 96.7 |
| Average Elmendorf Tear - Type B(Constant Radius) - CD | D1922 | 36.8 | 110.0 |
| Average Thickness Type B - CD (mils) |  | 1.7 | 2.3 |
| Average Elmendorf Tear - Type B(Constant Radius) - MD | D1922 | 14.0 | 14.0 |
| Average Thickness Type B - MD |  | 1.8 | 1.7 |
| Average Gloss 45 deg | D2457 | 108.8 | 102.0 |
| Average Haze | D1003 | 1.9 | 2.1 |
| Tensile - CD | D882 |  |  |
| Avg % Elongation (%) |  | 159.0 | 23.9 |
| Avg Ultimate Tensile (psi) |  | 2931.8 | 2309.6 |
| Avg Yield Stress (psi) |  | 2901.7 | 2309.6 |
| Tensile - MD | D882 |  |  |
| Avg % Elongation (%) |  | 22.2 | 30.3 |
| Avg Ultimate Tensile (psi) |  | 5842.2 | 5162.4 |
| Avg Yield Stress (psi) |  | 4602.6 | 4407.9 |
| Shrink tension (psi) | 105 C. | 547 | 360 |
| Shrink tension (psi) | 135 C. | 535 | 400 |

Examples 4 and 5

Another series of 5 layer structures were prepared. The skin layers are provided by Extruder A and C in this extrusion system and are each 15 wt percent of the overall film structure. These layers are made from a dry blend of 70 percent STYRON 668 GPPS and 30 percent K-Resin styrene-butadiene copolymer DK11 (available from Chevron Phillips). The tie layers are each 10 wt percent of the total film structure and are provided by Extruder D. The tie layers are made from KRATON G1730M. The core layer is 50 wt percent of the total film structure and is provided by Extruder B in this system. The core layer is a developmental propylene plastomer of the type described in WO03/040442 having 5 wt percent ethylene and a melt flow rate of 8 g/10 min. (ASTM D1238, 230 C, 2.6 kg) and a density of 0.888 g/cc.

For Example 5, the core layer is a developmental propylene plastomer of the type described in WO03/040442 having 9 wt percent ethylene and a melt flow rate of 8 g/10 min. (ASTM D1238, 230 C, 2.6 kg) and a density of 0.876 g/cc.

Film first passes through the MDO rolls with little orientation intentionally induced and then orientation is done in the cross direction of the film by means of a tenter frame. Various levels of orientation and varying temperatures of orientation are also studied.

The process conditions for these materials is present in Table V:

TABLE V

|  | Units | Sample 4-1 | Sample 4-2 | Sample 4-3 | Sample 4-4 | Sample 5 |
|---|---|---|---|---|---|---|
| Extruder A formulation (skin layer) |  |  |  |  |  |  |
| Screw speed | rpm | 22 | 21.8 | 22 | 22.1 | 22 |
| Head pressure | psi | 2054 | 2156 | 2066 | 2112 | 2130 |
| Melt temperature | F. | 449 | 449 | 449 | 447 | 446 |
| Motor torque | % | 51.2 | 55.9 | 52.6 | 52.6 | 51.2 |
| Extruder B formulation (core layer) |  |  |  |  |  |  |
| Screw speed | rpm | 17 | 17 | 16.9 | 16.9 | 16.9 |
| Head pressure | psig | 1276 | 1289 | 1279 | 1296 | 1480 |
| Melt temperature | F. | 419 | 418 | 418 | 418 | 408 |
| Motor torque | % | 29.9 | 30.1 | 29.8 | 29.8 | 33.9 |
| Extruder C formulation (skin layer) |  |  |  |  |  |  |
| Screw speed | rpm | 21.9 | 21.9 | 21.8 | 22 | 22 |
| Head pressure | psi | 1309 | 1401 | 1376 | 1356 | 1432 |
| Melt temperature | F. | 435 | 435 | 435 | 436 | 435 |
| Motor torque | % | 60.7 | 57.3 | 57.5 | 62.3 | 59.2 |
| Extruder D formulation (tie layer) |  |  |  |  |  |  |
| Screw speed | rpm | 4.02 | 4.02 | 4.04 | 4.01 | 4.02 |
| Head pressure | psi | 1450 | 1431 | 1431 | 1426 | 1483 |
| Melt temperature | F. | 2192 | 2192 | 2192 | 2192 | 2192 |
| Motor torque | % | 24.7 | 24.1 | 23.6 | 25.2 | 24.1 |
| Cast Roll #1 | F. | 145 | 144 | 145 | 145 | 126 |

TABLE V-continued

|  | Units | Sample 4-1 | Sample 4-2 | Sample 4-3 | Sample 4-4 | Sample 5 |
|---|---|---|---|---|---|---|
| Cast Roll #2 | F. | 130 | 130 | 130 | 130 | 124 |
| Cast line speed | fpm | 30.04 | 30 | 30 | 30 | 30 |
| MDO |  |  |  |  |  |  |
| Preheat #1 | F. | 170 | 171 | 171 | 170 | 161 |
| Preheat #2 | F. | 225 | 225 | 225 | 225 | 225 |
| Slow draw temp | F. | 274 | 274 | 275 | 274 | 276 |
| Fast draw temp | F. | 244 | 245 | 245 | 245 | 245 |
| Anneal | F. | 112 | 113 | 113 | 113 | 113 |
| Cooling | F. | 103 | 103 | 103 | 103 | 103 |
| Slow draw speed | fpm | 30 | 30 | 30 | 30.46 | 30.46 |
| Slow draw ratio | fpm | 1 | 1 | 1 | 1.08 | 1.08 |
| Fast draw speed |  | 30 | 30 | 30 | 30.43 | 30.47 |
| Fast draw ratio |  | 1 | 1 |  | 1 | 1 |
| TDO |  |  |  |  |  |  |
| Oven zone #1 | F. | 240 | 224 | 240 | 225 | 240 |
| Oven zone #2 | F. | 240 | 224 | 240 | 225 | 236 |
| Oven zone #3 | F. | 170 | 169 | 170 | 170 | 170 |
| Rail 2 initial | inches |  | 5 | 5 |  |  |
| Rail 4 initial | inches |  | 25 | 30 |  |  |
| Ratio |  | 5 | 5 | 6 | 6 | 5 |

Figure 3:
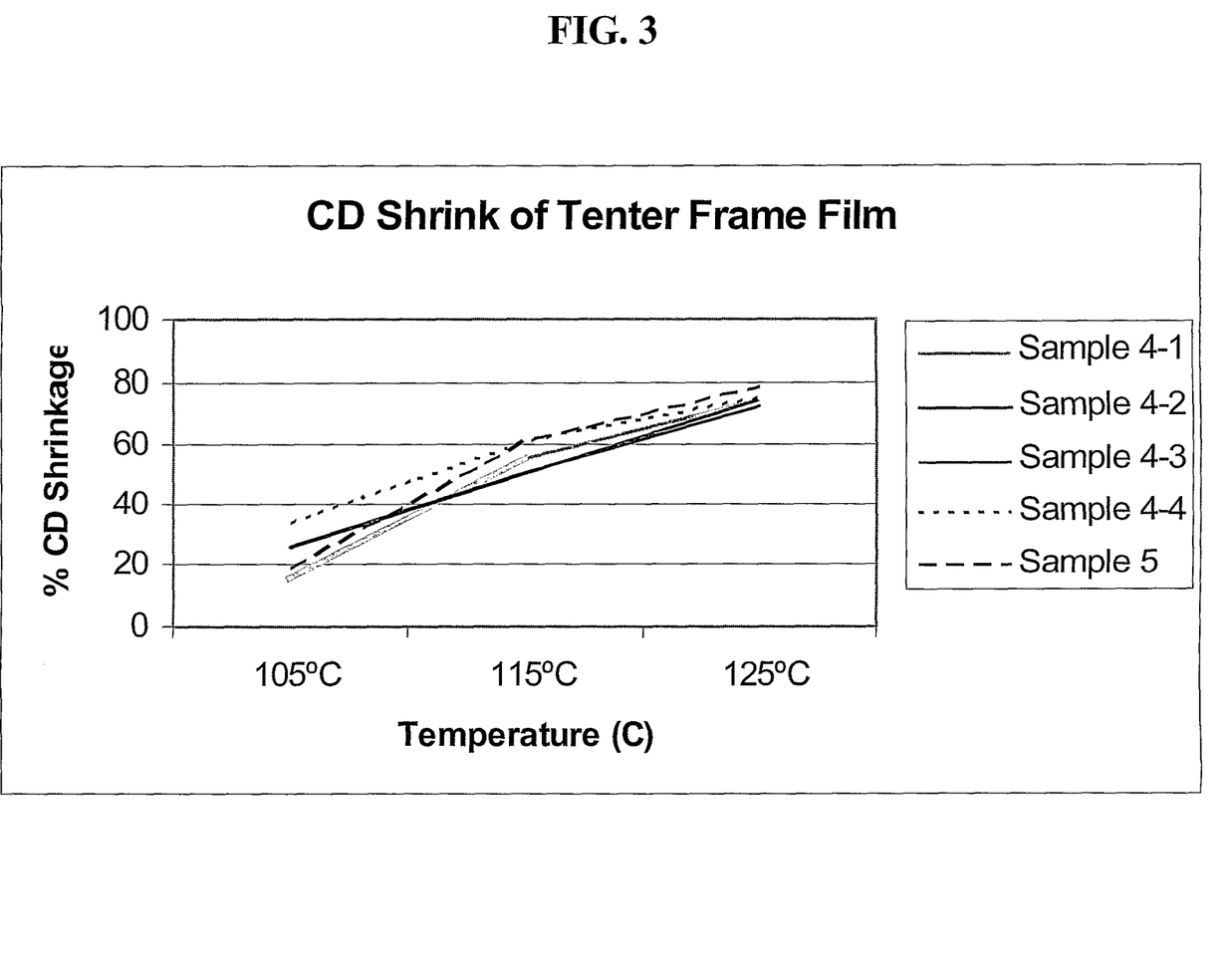
FIG. 3 is a graph showing the MD shrink data for the films of Samples 4-1 through 4-4 and 5.
Figure 4:
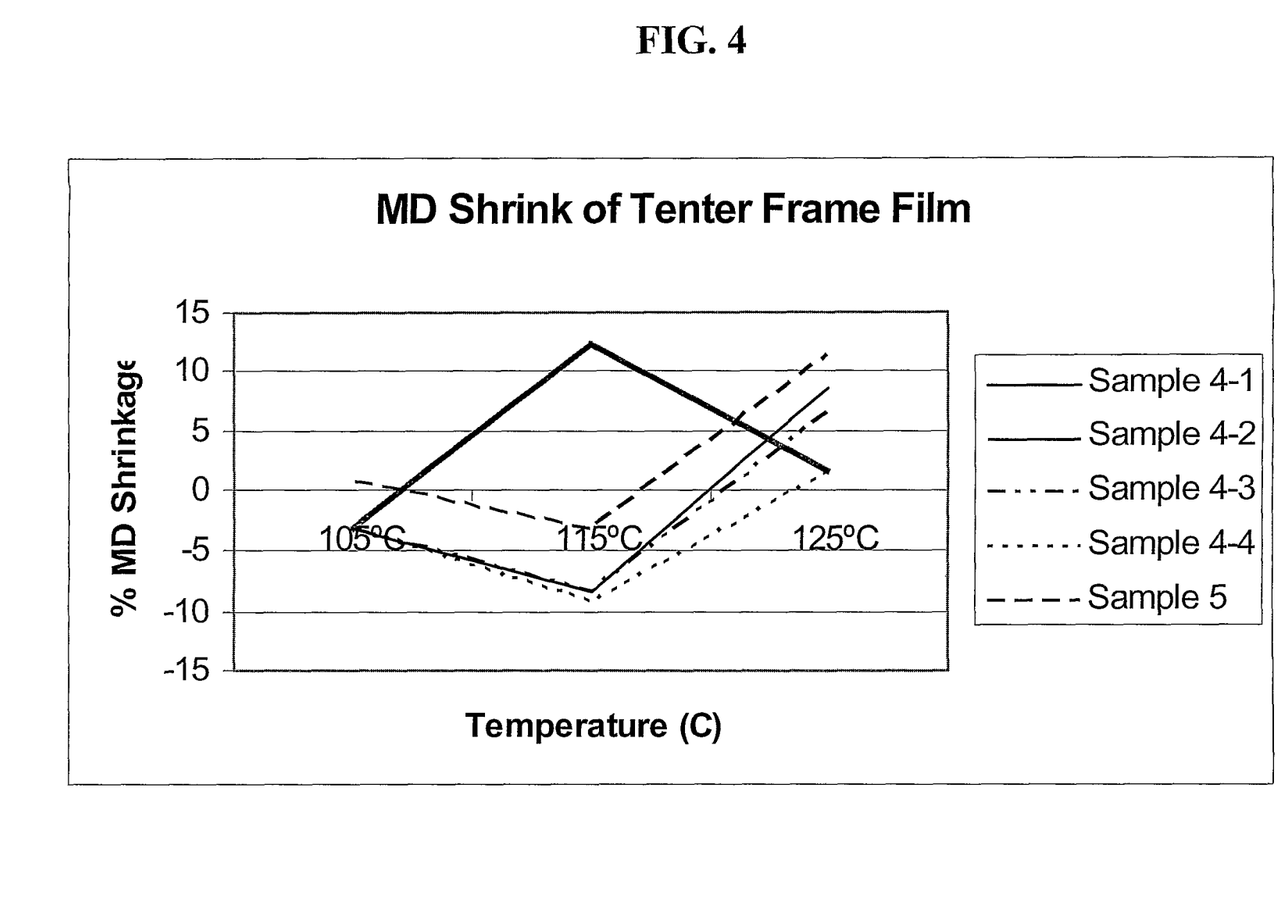
FIG. 4 is a graph showing the CD shrink data for the films of Samples 4-1 through 4-4 and 5.

The shrink properties are Presented in FIGS. 3 and 4.
The resulting film properties for these materials are presented in Table VI:

TABLE VI

|  | ASTM methods | Sample 4-1 | Sample 4-2 | Sample 4-3 | Sample 4-4 | Sample 5 |
|---|---|---|---|---|---|---|
| Average Clarity | D1746 | 99.1 | 98.2 | 98.7 | 99.0 | 98.0 |
| Average Elmendorf Tear - Type B(Constant Radius) -CD | D1922 | 28.2 | 36.8 | 25.4 | 5.2 | 17.0 |
| Average Thickness Type B- CD |  | 1.6 | 1.4 | 1.2 | 1.2 | 1.3 |
| Average Elmendorf Tear - Type B(Constant Radius) -MD | D1922 | 11.8 | 7.2 | 5.2 | 30.8 | 20.2 |
| Average Thickness Type B - MD |  | 1.3 | 1.4 | 1.2 | 1.3 | 1.2 |
| Average Gloss 45 deg | D2457 | 107.8 | 95.8 | 108.7 | 91.9 | 105.6 |
| Average Haze | D1003 | 1.3 | 3.1 | 1.4 | 4.3 | 1.3 |
| Tensile - CD | D882 |  |  |  |  |  |
| Avg % Elongation (%) |  | 35.5 | 27.9 | 29.3 | 20.3 | 13.6 |
| Avg Ultimate Tensile (psi) |  | 8065.6 | 12390.4 | 8151.3 | 13833.1 | 4716.2 |
| Avg Yield Stress (psi) |  | 5691.3 | 5084.1 | 5417.8 | 13833.1 | 4675.0 |
| Tensile - MD | D882 |  |  |  |  |  |
| Avg % Elongation (%) |  | 5.9 | 5.9 | 5.6 | 29.2 | 6.7 |
| Avg Ultimate Tensile (psi) |  | 4621.1 | 4187.3 | 4293.9 | 4425.3 | 2820.7 |
| Avg Yield Stress (psi) |  | 4621.0 | 4187.3 | 4293.9 | 4425.3 | 2820.7 |
| Shrink tension (psi) | 105 C. | 333 | 1212 | 567 | 1338 | 167 |
| Shrink tension (psi) | 135 C. | 350 | 1098 | 473 | 1433 | 40 |

As seen from Examples 4 and 5, changing the orientation temperature in the tenter frame oven impacts the shrink tension (Sample 4-2 & 4-4 run at lower temperatures). Additionally, changing to lower density materials in the core can also reduce the shrink tension (Sample 5).

What is claimed is:

1. A multi-layer oriented shrink film comprising at least one skin layer comprising an amorphous glassy polymer material and at least one core layer comprising a polyolefin layer wherein the shrink film has been subjected to either biaxial orientation with preferential orientation of at least two times in either the machine or cross direction or monoaxial orientation; and wherein the polyolefin material is a propylene interpolymer prepared using a nonmetallocene, metal-centered, heteroaryl ligand catalyst in combination with one or more activators.

2. The multi-layer film of claim 1 wherein the amorphous glassy polymer is a polystyrene material.

3. The multi-layer film of claim 1 wherein the overall density of the film is less than 1.0 g/cm$^3$.

4. The multi-layer film of claim 3 wherein the overall density of the film is less than 0.98 g/cm$^3$.

5. The multi-layer film of claim 1 wherein the orientation is biaxial orientation with orientation in one direction which is at least three times that of the opposite direction.

6. The multi-layer film of claim 1 wherein the orientation is biaxial orientation with orientation in one direction which is at least four times that of the opposite direction.

7. The multi-layer film of claim 1 wherein the film has a shrink tension less than 500 psi.

8. The multi-layer film of claim 1 wherein the film has a shrink tension less than 250 psi.

9. The multi-layer film of claim 1 further comprising a tie layer between the at least one skin layer and the at least one core layer.

10. The multi-layer film of claim 2 wherein the polystyrene material comprises one or more of GPPS, HIPS; SBS; SIS; or SEBS.

11. The multi-layer film of claim 10 where the polystyrene material comprises HIPS having an average rubber particle size of less than about 1 micron.

12. The multi-layer film of claim 1 wherein the amorphous glassy polymer material comprises one or more of PETG, amorphous PET, amorphous PLA or PVC.

13. The multi-layer film of claim 9 wherein the tie layer comprises one or more of SEBS, SEPS, EVA, SBS, SIS; or SEBS.

14. The multi-layer film of claim 9 wherein the film comprises two skin layers each of which comprises an amorphous glassy polymer, and wherein the amorphous glassy polymer skin layers comprise 10% to 80% by weight of the entire film and the polyolefin layer comprises 20 to 90 percent by weight of the entire film and the tie layer comprises from 5 to 15 percent by weight of the entire film.

15. A shrink label comprising a multi-layer film of claim 1.

16. The shrink label of claim 15 wherein the shrink label is a roll-on shrink-on (ROSO) label.

17. The shrink label of claim 15 wherein the shrink label is a sleeve-type label.

18. The shrink label of claim 16 characterized in that the label shrinks greater than 40% at 135° C. in the direction of preferential orientation.

19. The shrink label of claim 17 characterized in that the label shrinks greater than 40% at 135° C. in the direction of preferential orientation.

* * * * *